(12) United States Patent
Lange et al.

(10) Patent No.: US 7,681,599 B2
(45) Date of Patent: Mar. 23, 2010

(54) LINE PIPE FOR THE TRANSPORT OF DEEP-FROZEN MEDIA

(75) Inventors: Stephan Lange, Wedemark (DE); Michele Di Palma, Springe (DE); Christian Frohne, Hannover (DE); Klaus Schippl, Hannover (DE); Thomas Merten, Hannover (DE)

(73) Assignee: Nexans, Paris (FR)

( * ) Notice: Subject to any disclaimer, the term of this patent is extended or adjusted under 35 U.S.C. 154(b) by 651 days.

(21) Appl. No.: 11/599,186

(22) Filed: Nov. 14, 2006

(65) Prior Publication Data

US 2007/0164246 A1 Jul. 19, 2007

(30) Foreign Application Priority Data

Dec. 9, 2005 (EP) .................................. 05292659

(51) Int. Cl.
*F16L 9/18* (2006.01)
(52) U.S. Cl. .................. 138/114; 138/113; 138/148; 138/149; 138/108
(58) Field of Classification Search .......... 138/148, 138/149, 111, 114, DIG. 4, 113, 108; 62/50.7, 62/55.5
See application file for complete search history.

(56) References Cited

U.S. PATENT DOCUMENTS

| | | | | |
|---|---|---|---|---|
| 4,332,401 A * | 6/1982 | Stephenson et al. | ............ | 285/47 |
| 4,415,184 A * | 11/1983 | Stephenson et al. | ........... | 285/47 |
| 4,515,397 A * | 5/1985 | Nowobilski et al. | ........... | 285/47 |
| 6,094,922 A * | 8/2000 | Ziegler | ....................... | 62/50.7 |
| 6,883,549 B2 * | 4/2005 | Schippl | ....................... | 138/114 |

FOREIGN PATENT DOCUMENTS

| | | |
|---|---|---|
| DE | 19602940 | 7/1997 |
| EP | 1363062 | 11/2003 |
| EP | 1586715 | 10/2005 |

* cited by examiner

*Primary Examiner*—Patrick F Brinson
(74) *Attorney, Agent, or Firm*—Sofer & Haroun, LLP

(57) ABSTRACT

A line pipe for the transport of deep-frozen media, consisting of at least two corrugated metal pipes (2, 4) arranged concentrically and at a distance from one another, an insulation layer (3) being arranged in the annular gap between the two metal pipes (2, 4), the annular gap being evacuated, and a closing valve (10) provided in the outer metal pipe (4) being connectable to a vacuum pump, the closing valve being welded, vacuum-tight, into a smooth-walled metal pipe (9) welded, vacuum-tight, to the exterior of the metal pipes (4). The valve body (10) of the closing valve projects into the interior of the smooth-walled metal pipe (9) and is flush with the outer surface area of the smooth-walled metal pipe (9).

4 Claims, 4 Drawing Sheets

US 7,681,599 B2

LINE PIPE FOR THE TRANSPORT OF DEEP-FROZEN MEDIA

RELATED APPLICATION

This application is related to and claims the benefit of priority from European Patent Application No. 05292659.9, filed on Dec. 9, 2005, the entirety of which is incorporated herein by reference.

FIELD OF THE INVENTION

The invention relates to a line pipe for the transport of deep-frozen media.

BACKGROUND

EP 1 363 062 A1 discloses a line pipe for the transport of deep-frozen media, which consists of at least two metal pipes arranged concentrically and at a distance from one another, an insulating layer being arranged in the annular gap between the metal pipes, and the annular gap being evacuated. According to an advantageous embodiment, the metal pipes are longitudinally welded and corrugated high-grade steel pipes. On account of the corrugation, line pipes of the type described can be produced in great lengths. The insulating layer consists of plies arranged alternately one above the other and composed of insulating material and of a material having a reflecting surface. Glass fibre fleece and aluminium foils are preferred. An insulation composed of these materials in combination with a high vacuum is designated in cryotechnics as superinsulation. The known line pipes are used preferably as transfer lines for condensed gases, but also as cryostats for superconductor cables.

The known line pipes are distinguished by high economic efficiency, since, because of the great length which can be produced, a multiplicity of junction connections are unnecessary, as compared with lines consisting of smooth pipes. Owing to the flexibility, the lines can also be laid in narrow radii.

One disadvantage of the known lines is that, because of the great length, evacuation from the ends is highly time-consuming.

EP 1 363 062 therefore proposes to separate the exterior of the metal pipes at predetermined intervals and to weld, vacuum-tight, a pumping connection piece to the outer metal pipe at each orifice. For this purpose, metal-ring halves are placed onto the two ends of the outer metal pipe in the region of the orifice and are welded to the ends of the outer metal pipe. Half-shells consisting of a smooth-walled metal pipe are then placed onto the metal-ring halves and welded to the metal-ring halves and in their longitudinal directions. One of the half-shells has a connection piece for a vacuum pump. This design has the disadvantage that the metal-ring halves and the connection piece project out of the circumferential surface of the outer metal pipe. It is consequently not possible to draw the line pipe into narrow ducts.

Designs with a projecting pumping connection piece which have similar disadvantages are disclosed in DE 31 42 702 A, U.S. Pat. No. 6,257,282 B1, WO 01/27514 A1 and U.S. Pat. No. 4,046,407.

OBJECT AND SUMMARY

The object on which the present invention is based is to provide a line pipe of the type mentioned in the introduction, which can be laid, even in great lengths, in narrow cable ducts and can be reevacuated quickly and simply, should the vacuum have been impaired due to possible leakages.

The essential advantage of the invention is to be seen in that, in the line pipe according to the teaching of the invention, there are no projecting parts which cause an obstruction when the line pipe is drawn into a cable duct. The pumping connection piece provided in the prior art and projecting outwards is replaced by an adapter which is attached only in the situation where repumping has to be carried out. The adapter is then screwed, vacuum-tight, to the valve body, and a gas lock known per se releases a screw plug screwed into the valve body and thus affords access to the annular space.

DETAILED DESCRIPTION

The invention is explained in more detail by means of the exemplary embodiments of a superconductor cable which are illustrated diagrammatically in FIGS. 1 to 5.

Figure 1:
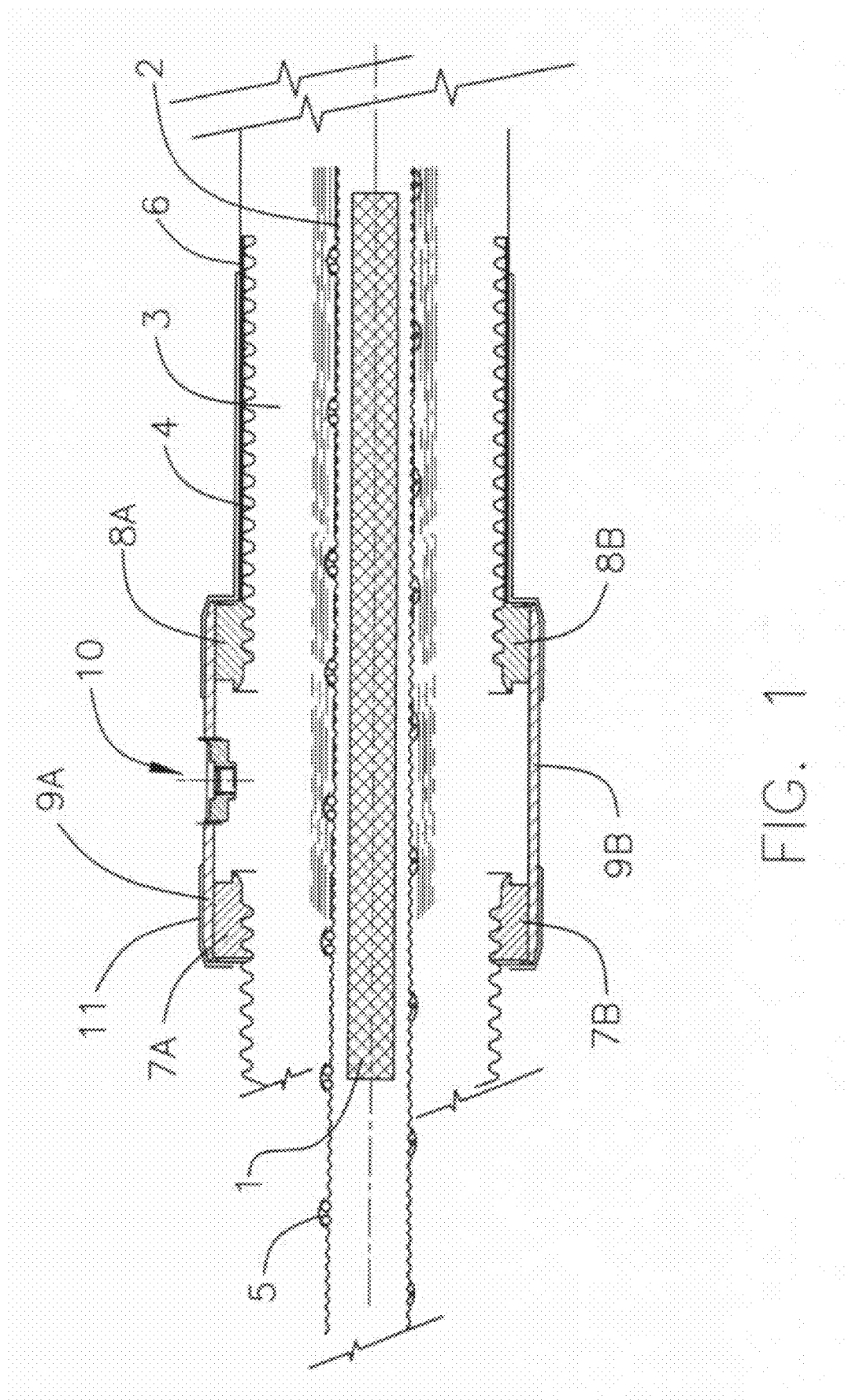
FIG. 1 shows a section through a lateral view of a superconductor cable, in accordance with one embodiment of the present invention.

FIG. 1 shows a section through a lateral view of a superconductor cable which consists of a superconducting cable core 1 and of a cryogenic envelope surrounding the superconducting cable core 1. The cryogenic envelope is designed as a line pipe consisting of an inner pipe 2, of a superinsulation 3 and of an outer pipe 4. The inner pipe 2 is a longitudinally welded corrugated pipe composed of austenitic steel. A spacer 5 is wound helically onto the inner pipe 2. Arranged on the inner pipe 2 and the spacer 5 is the superinsulation layer 3 which consists of alternately applied plies composed of reflecting metal foils, for example aluminium-coated plastic foils, and foils consisting of material having no heat conductivity, for example of glass fibre fleece.

The outer pipe 4 is likewise a longitudinally welded corrugated metal pipe composed of austenitic steel, which may be surrounded by a plastic casing 6. The superconductor cable illustrated may be produced in great lengths continuously at the factory in a way customary in cable technology, the maximum length being limited by the capacity of the means of transport, for example by the size of the cable drum.

In order to accelerate or make possible at all the evacuation process both directly after manufacture and after laying, the plastic casing 6 and the outer pipe 4 are removed over a limited length at predetermined intervals of, for example, 100 m.

Two half-shells 7a, 7b and 8a, 8b are placed in each case onto the ends of the outer pipe 4 and are welded, vacuum-tight, at their parting planes and on their mutually confronting end faces to the ends of the outer pipe 4. The half-shells 7a, 7b and 8a, 8b likewise consist of austenitic steel. As can be seen from FIG. 1, the half-shells 7a, 7b and 8a, 8b have, on their surfaces confronting the outer pipe 4, a profiling which is adapted to the shape of the corrugation of the outer pipe 4 and which connects the half-shells or the rings welded from the half-shells 7a, 7b and 8a, 8b to the outer pipe 4 with a form fit and thus relieve the weld seam. Two half-shells 9a and 9b, which are produced from sheet-metal sections composed of austenitic steel, are laid around over the rings formed from the half-shells 7a, 7b and 8a, 8b and welded, vacuum-tight, on the end faces to the half-shells 7a, 7b and 8a, 8b and at their parting plane. The half-shell 9a has a valve body 10, to which a vacuum pump can be connected.

Instead of the half-shells 7a, 7b, 8a and 8b placed onto the outer pipe 4, half-shells may also be used which are screwed into the outer pipe 4 after the longitudinal seams have been welded together.

A protective sleeve 11 may also be laid around over the half-shells 9a, 9b and the plastic casing 6.

The annular gap which is located between the inner pipe 2 and the outer pipe 4 and is partially filled with the superinsulation layer is partitioned off outwards, vacuum-tight, at both ends of a cable length.

After this preparatory work has been completed, vacuum pumps, not illustrated, which evacuate the annular gap, are connected to the valve bodies 10.

In the case of a cable length of approximately 500 m, four valve bodies 10 are provided in each case at an interval of 100 m. In order to intercept residual gases which are released in the annular gap after evacuation, a getter material may be introduced into the annular gap, preferably during the production of the pumping connections.

Figure 2:
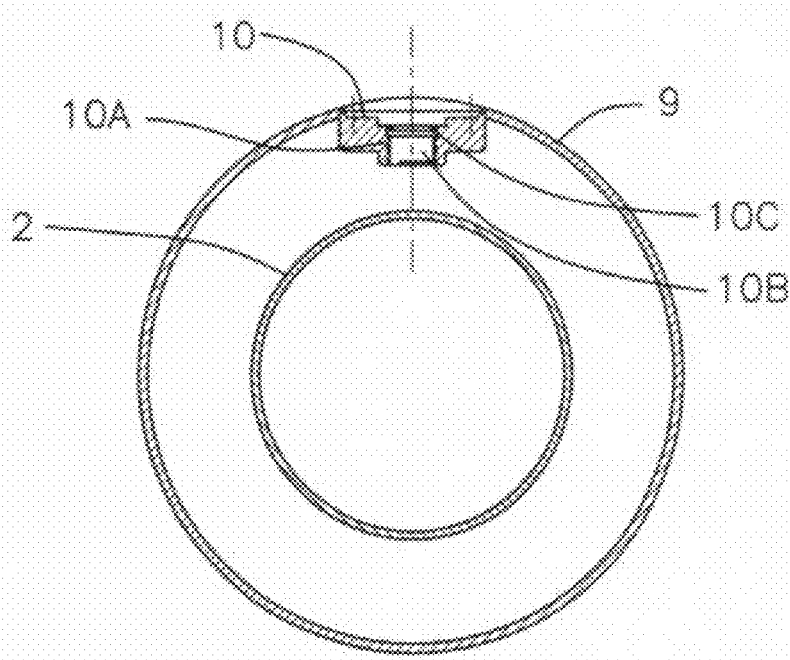
FIG. 2 shows a section through the region of the cable of FIG. 1 in which the outer pipe of the line pipe is removed, in accordance with one embodiment of the present invention.
Figure 3:
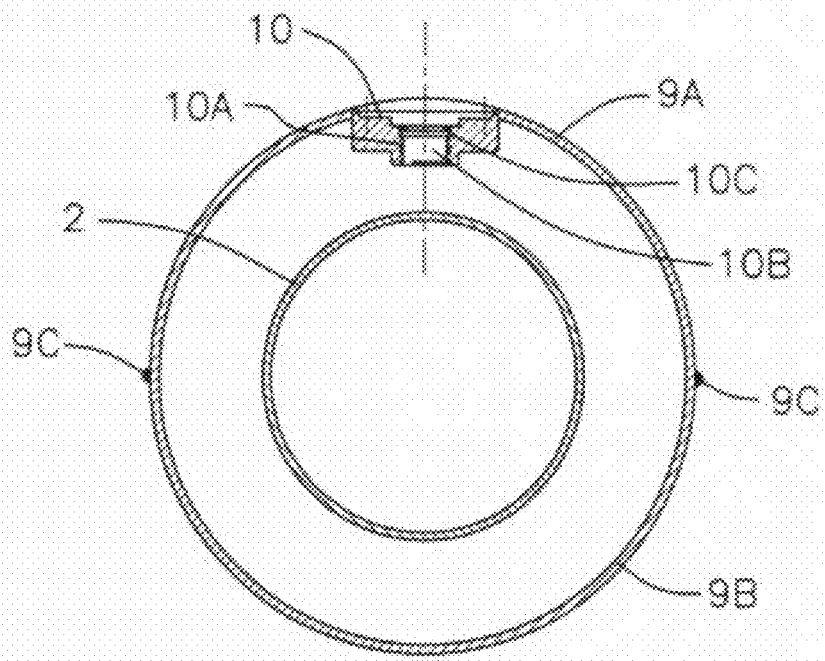
FIG. 3 shows a section through the region of the pipe of FIG. 1 in which the outer pipe of the line pipe is removed, in accordance with one embodiment of the present invention.

FIGS. 2 and 3 show a section through the region in which the outer pipe 4 of the line pipe is removed. A valve body 10 is welded into a bore in a smooth-walled metal pipe 9 which is welded at its ends to the ends of the outer pipe 4. The valve body 10 projects into the interior of the smooth-walled metal pipe 9 and is adapted on its outwardly pointing surface to the rounding of the metal pipe 9, so that the outwardly pointing surface of the valve body 10 is flush with the surface area of the metal pipe 9.

The valve body 10 has a threaded bore 10a, into which a screw plug 10b is screwed, vacuum-tight. A sealing ring 10c ensures the required sealing-off.

The version illustrated in FIG. 2 is suitable for attachment to the end of the line pipe.

FIG. 3 illustrates the same version, but, here, the smooth-walled metal pipe 9 is formed from the two half-shells 9a and 9b which are welded to one another at their longitudinal seams 9c. This version is used between the two ends of the line pipe.

The version illustrated in FIGS. 1 to 3 shows the state of the line pipe after evacuation. Since there is no appreciable increase in outside diameter, the line pipe can be drawn in great lengths into existing cable ducts. It is particularly advantageous if the regions where the outer pipe 4 is removed are accessible from outside, that is to say if a manhole, as it is known, or a cable shaft is provided there.

Figure 4:
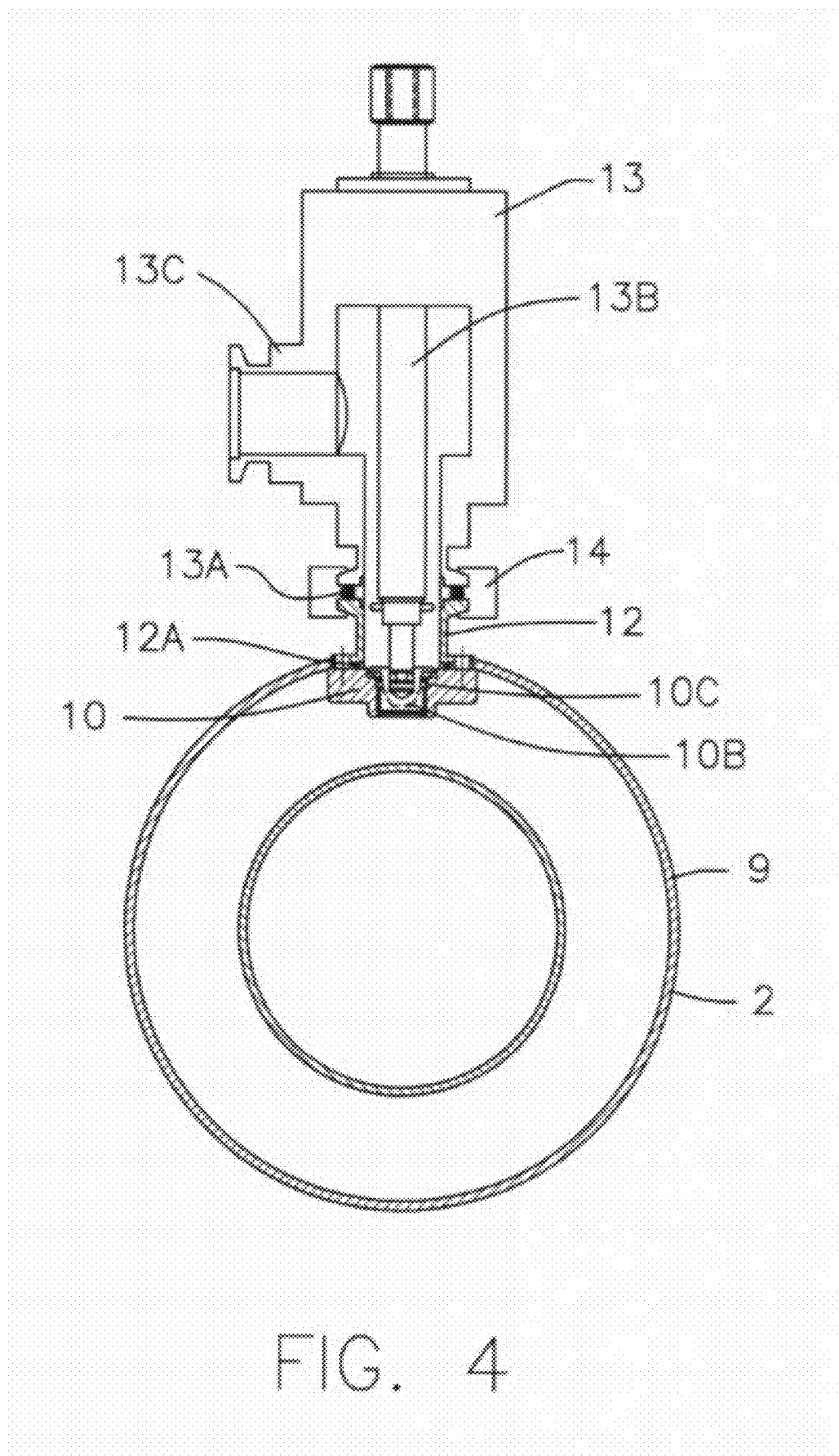
FIG. 4 illustrates the operation of evacuation or reevacuation of the cable of FIG. 1, in accordance with one embodiment of the present invention.

The operation of evacuation or reevacuation will be described in more detail below with reference to FIGS. 4 and 5.

First, an adapter 12 is placed onto the valve body 10 and connected, vacuum-tight, to the valve body 10 by means of screw bolts, not illustrated, which are screwed into corresponding threaded bores, not illustrated, in the valve body 10. A sealing ring 12a ensures the required leak-tightness. A gas lock 13 known per se is then connected, vacuum-tight, to the adapter 12 by means of a tension ring 14. A sealing ring 13a is located at the seam between the adapter 12 and gas lock 13.

The bolt 13b, mounted rotatably in the housing of the gas lock 13, is lowered and penetrates with its end confronting the valve body 10 into an orifice, not designated in any more detail, in the screw plug 10b and releases the latter as a result of rotation.

Figure 5:
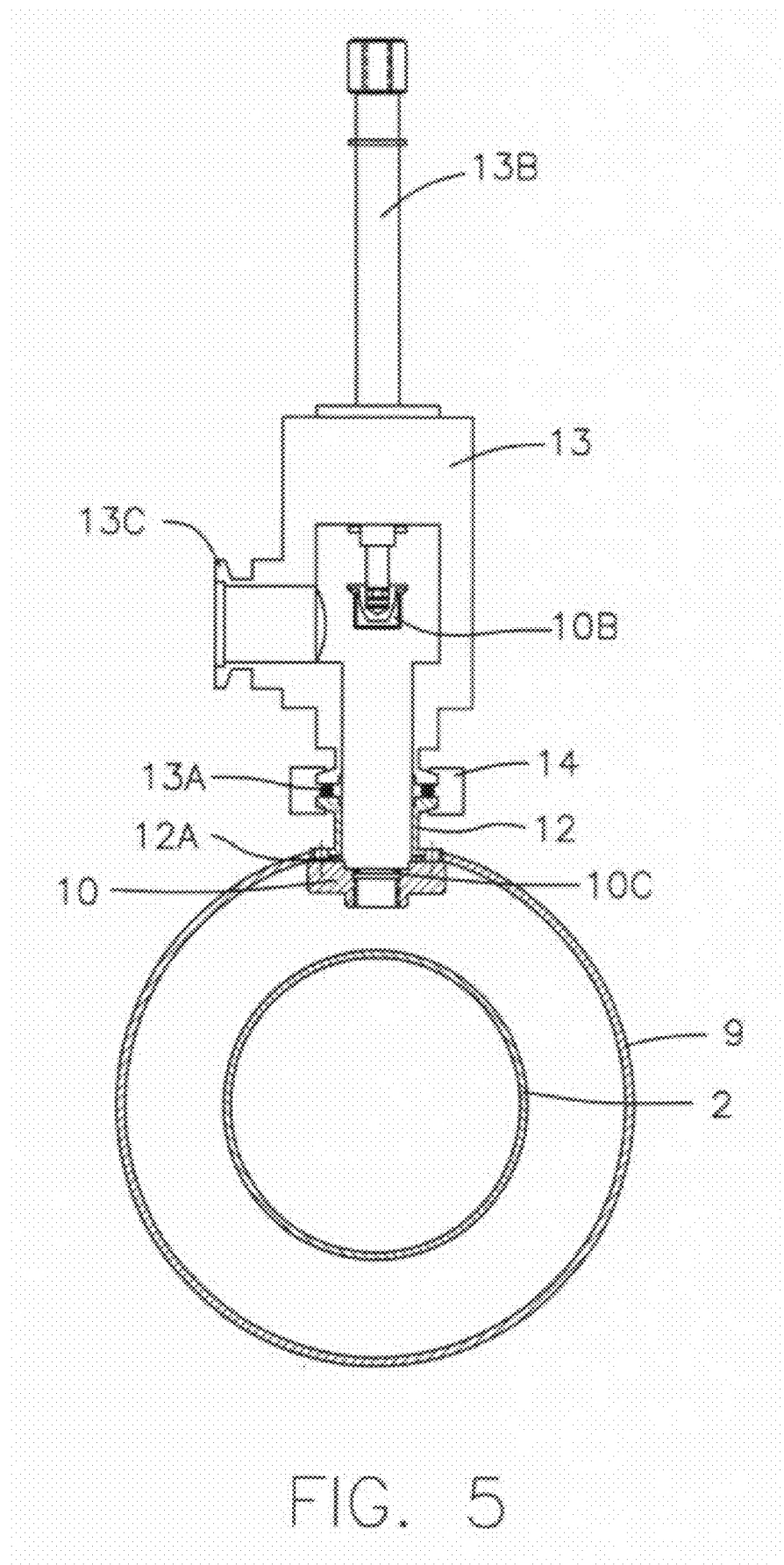
FIG. 5 illustrates the operation of evacuation or reevacuation of the cable of FIG. 1, in accordance with one embodiment of the present invention.

As illustrated in FIG. 5, after the release of the screw plug 10b, the bolt 13b is raised together with the latter, with the result that access to the annular gap between the inner pipe 2 and the outer pipe 4 or smooth pipe 9 is freed. A vacuum pump, not illustrated, which is connected to the flange 13c of the gas lock 13, can then set the evacuation operation in motion.

After the required vacuum has been generated, the bolt 13b, together with the screw plug 10b, moves downwards and screws the latter into the threaded bore 10a of the valve body 10 again.

Where reevacuation is concerned, it is necessary to evacuate the interior of the gas lock 13 before the screw plug 10b is unscrewed.

There may be no need to remove the adapter 12 if the evacuation process has been carried out on an already laid line pipe.

The invention claimed is:

1. Line pipe for the transport of deep-frozen media comprising:
    at least two corrugated metal tubes arranged concentrically and at a distance from one another;
    an insulation layer being arranged in the annular gap between the two metal tubes, the annular gap being evacuated;
    wherein a smooth walled metal tube is welded, vacuum tight, to the outer of said two metal tubes having an element to which a vacuum pump is connectable in a vacuum tight manner,
    wherein the element for the connecting of a vacuum pump is a closing valve provided with a valve body protruding into the interior of the smooth-walled metal tube which is welded to the same vacuum tight and which is flush with the outer surface area of the smooth-walled metal pipe,
    the valve body has a central threaded bore which is closed vacuum-tight by a screw plug during the operating conditions of the line pipe; and
    the valve body has threaded bores for the vacuum-tight connection of an adapter by use of screw bolts which serves to the vacuum-tight connection of a gas lock to which the vacuum pump is connectable.

2. Line pipe according to claim 1, wherein the smooth-walled metal pipe is welded to at least one end of the line pipe.

3. Line pipe according to claim 1, wherein the smooth-walled metal pipe is welded into the exterior of the metal pipes at intervals of 50 to 200 m.

4. Line pipe according to one of claim 1, wherein the smooth-walled metal pipe is composed of two half-shells which are welded, vacuum-tight, to one another.

* * * * *